United States Patent [19]

Berler

[11] Patent Number: 4,580,814
[45] Date of Patent: Apr. 8, 1986

[54] WEATHER GUIDE FOR DERIVING TYPICAL WEATHER CONDITIONS

[76] Inventor: Robert M. Berler, 3 Bruce La., Westport, Conn. 06880

[21] Appl. No.: 598,381

[22] Filed: Apr. 9, 1984

[51] Int. Cl.⁴ ............... B42D 15/00; B42D 5/04; G06C 3/00
[52] U.S. Cl. .......................... 283/67; 283/2; 283/65; 235/89 R
[58] Field of Search ............ 283/67, 2, 3, 65; 235/70 R, 84, 89 R; 285/89 R

[56] References Cited

U.S. PATENT DOCUMENTS

| | | | |
|---|---|---|---|
| 3,125,290 | 3/1964 | Smith | 235/89 R |
| 3,747,847 | 7/1973 | Cohen | 235/89 R |
| 4,028,529 | 6/1977 | Van De Weghe | 235/89 |
| 4,120,451 | 10/1978 | Stapleton | 235/89 R |
| 4,146,173 | 3/1979 | Pointner | 235/89 R |
| 4,308,449 | 12/1981 | Kelley | 235/70 |
| 4,308,450 | 12/1981 | Ausman et al. | 235/70 |
| 4,346,288 | 8/1982 | Foster | 235/70 |

FOREIGN PATENT DOCUMENTS 556107  8/1930  Fed. Rep. of Germany .... 235/89 R

OTHER PUBLICATIONS

Monthly Weather & Dress Guide, Folder, 3-Two Sided Inserts, Two col. (1 page) Instructions-Weather Trends Int'l, Ltd., New York, N.Y.
World Climate Chart-1978 Edition-1AMAT, 350 Fifth Ave., Suite 5620, New York, N.Y. 10001, 2 pages.
Forecast Computer, L. L. Bean, Freeport, Maine, 2 pages.

Primary Examiner—Paul A. Bell
Assistant Examiner—Paul M. Heyrana, Sr.

[57] ABSTRACT

A device for foretelling the typical weather in a given locality for any month of the year, based on actual historically recorded weather data, is provided. The device is in the form of a hand held sleeve member having front and back panels and an insert member which is relatively slidably contained within the sleeve. A large amount of weather data in a useful format is assembled on the faces of the insert member. The sleeve member with a front and a back panel contains openings or windows in the panel and, imprinted contiguous to the windows, the cities or locations of a given geographical area. The device permits the weather information in the desired location to be quickly read out through the window from the imprinted information on the slidable insert member. The two-piece slide device is one whose physical configuration is of a form that can be manufactured from a suitable semi-rigid opaque, thin paper or plastic stock. The weather information compiled on the insert slide member of the weather guide device is derived from weather information records.

4 Claims, 5 Drawing Figures

WEATHER GUIDE FOR DERIVING TYPICAL WEATHER CONDITIONS

This invention relates to slide devices for foretelling for any given time and location, weather which is derived from actual historically recorded weather data. More particularly the invention relates to a weather guide that is preferably hand held and permits one to estimate the temperature and precipitation, i.e. rain or snow to be encountered in a given area in any given month of the year.

BACKGROUND OF THE INVENTION

The question of what kind of weather will be encountered arises frequently when one is anticipating travel or may be going on a business trip in a distant country. Attempts to get a reliable answer to this question, which has often been put to travel agents in the past, have rarely been satisfactory. Even in instances where an answer predicting the weather that may be expected in a given location is forthcoming, it is usually "off-the-cuff" and hardly ever of a predictable quality based on factual information. Undoubtedly, this lack of relatively sound predictability of weather information is due to the fact that there exists no readily available useful reference which can quickly supply a reasonable typical forecast, based on documented data, of the weather in distant cities for each month of the year.

Although weather information for most major cities is officially recorded in various reports, these records are generally not readily accessible at the desired moment or, in any event, the form of the data presents difficulty in, or a psychological block to, quickly extracting the pertinent information that can be used for forecasting typical weather for a given time and location. Accordingly, a need exists for a convenient practical and handy device and method for determining essentially immediately what the typical weather in a given geographical location will be for any given time of the year.

SUMMARY OF THE INVENTION

The weather guide described and shown in detail hereafter essentially comprises a compilation of a large amount of weather data taken from actual recorded weather data and arranged in a slide chart format that comprises an envelope like member having a front panel and back panel and a slide member that moves freely within the envelope, i.e., with the slide member movable between the two panels. The front and back panels contain the cities, or locations, of a given geographical area. The slide member, i.e., the insert, which fits between the two panels contains weather information imprinted on the face(s) of the insert. One of the several openings or windows in the panel face permit the weather information at the desired location and month of the year to be quickly read out from the imprinted information on the slide member thereby affording a convenient means to foretell typical weather conditions at a plurality of diverse geographical cities. The two-piece slide chart device is one whose physical configuration is of a form that can be conveniently held in the hand and may be carried in a pocket or purse and that can be manufactured from a suitable semi-rigid opaque, thin cardboard or plastic sheeting. A flat outer sleeve is formed to have a front face and a back face panel with openings in the panel face(s) through which a block of information contained on an inner (medial) slide can be read. The inner slide or insert fits in slidable relationship within the sleeve, i.e., between the front panel and back panel, in close fitting, yet easily slidable, relationship. The data compiled on the insert of the weather guide of the invention is derived from any reliable recorded weather information, for example, from the TABLES OF TEMPERATURE, RELATIVE HUMIDITY AND PRECIPITATION FOR THE WORLD, printed by Her Majesty's Stationary Office, London, England.

BRIEF DESCRIPTION OF THE DRAWING

In the accompanying drawing:

FIG. 4 is a fragmented plan view of the front side of the slide (insert) member which fits within the sleeve and which supplies weather information to be read through the openings in the front panel member.

DETAILED DESCRIPTION OF THE PREFERRED EMBODIMENT

Figure 1:
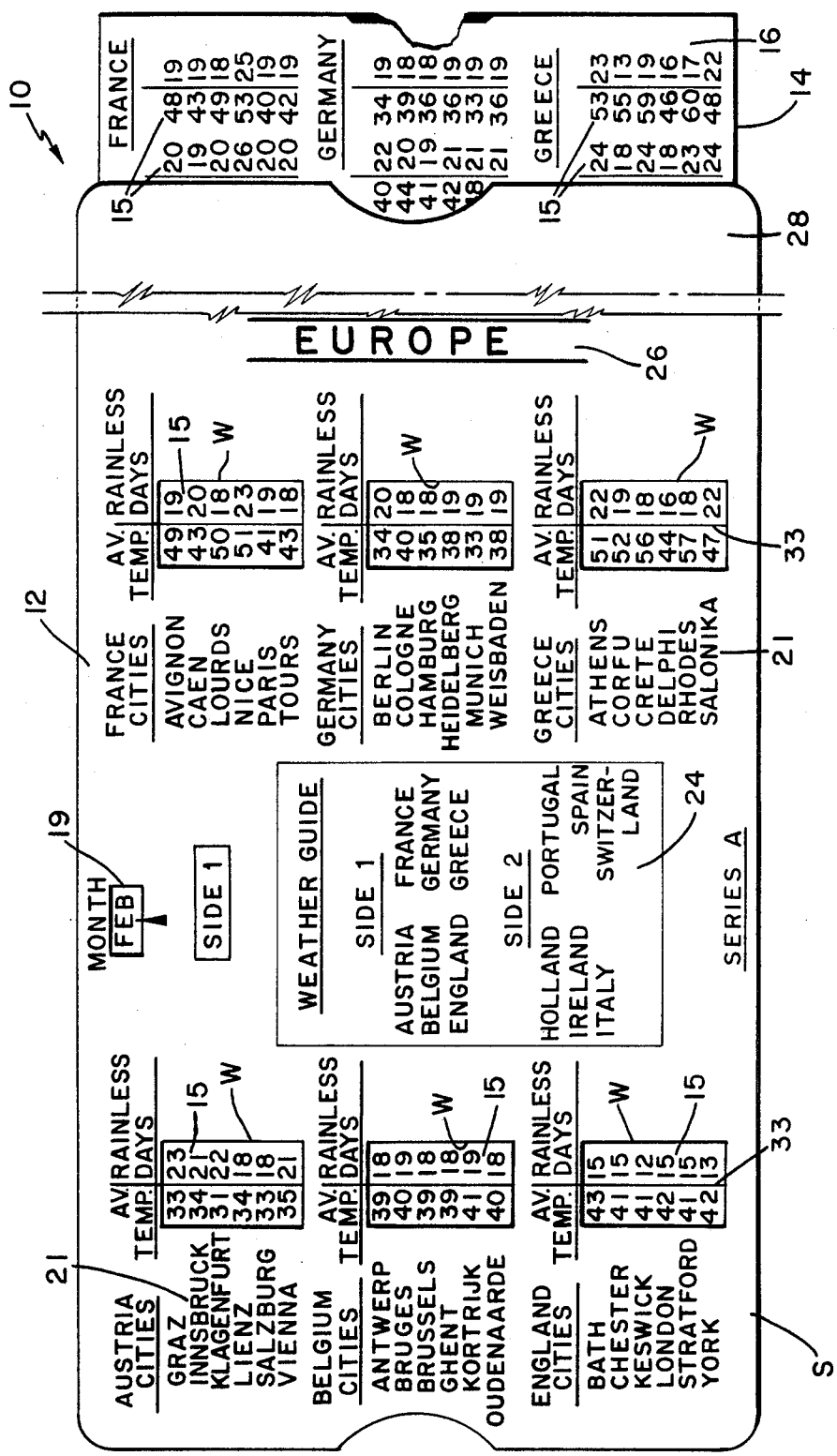
FIG. 1 is a fragmented plan view of the weather guide of the invention showing the front panel of the sleeve and with the slide member in position and partially extended.

The weather guide comprises a flat two-piece construction having an outer sleeve comprised of a front face panel and a back face panel and on which the names of cities in a given region are imprinted. The sleeve panels are provided with a plurality of openings or windows, of a size to admit a limited amount of information, through which the month of the year, as well as, the weather information which is imprinted on the interior slide member, is exposed for reading. The interior slide member which contains, in compact alignment, the recorded average noontime information for the middle of each month fits snugly, but is easily slidable within the sleeve between the front and back panels thereof, to permit a readout for each month of the year for each city or locality. The device readily accomodates in a typical arrangement thirty-six (36) cities on each side so that a given weather guide unit can, in a pocket size device, provide weather information for a total of seventy-two (72) cities. This amount of information is generally ample for any region of the world.

The makeup of the weather guide may be understood more clearly by reference to the figures of the drawing wherein the basic format of the weather guide is illustrated in FIG. 1 through FIG. 5. In the drawing the weather guide is illustrated in a size sufficient to enable legends and numerals to meet minimum size requirements for the drawing. Accordingly, it will be apparent that in a practical embodiment the legends and numerals may be reduced, thereby reducing the overall size of the weather guide.

Figure 2:
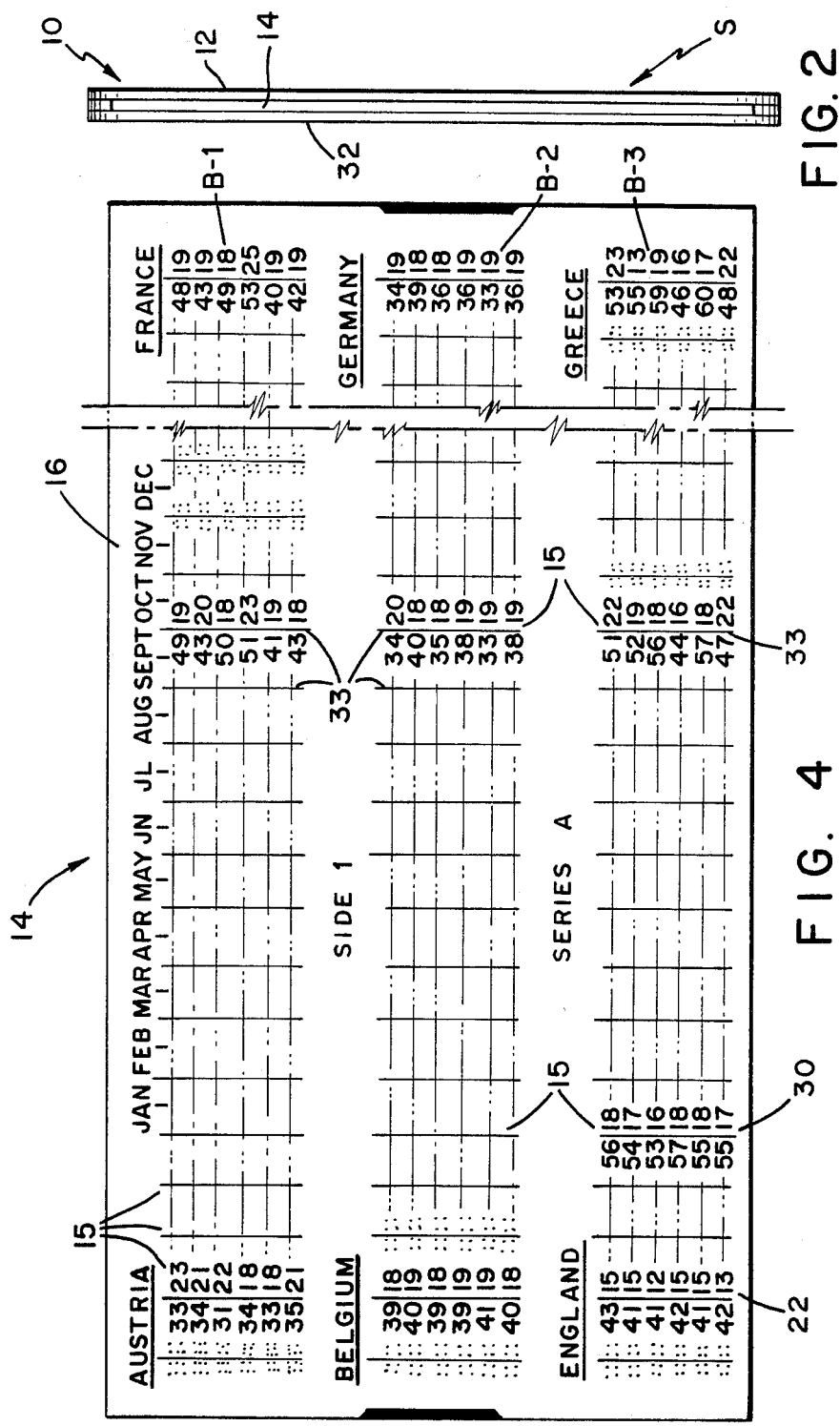
FIG. 2 is an end view of the weather guide.
Figure 3:
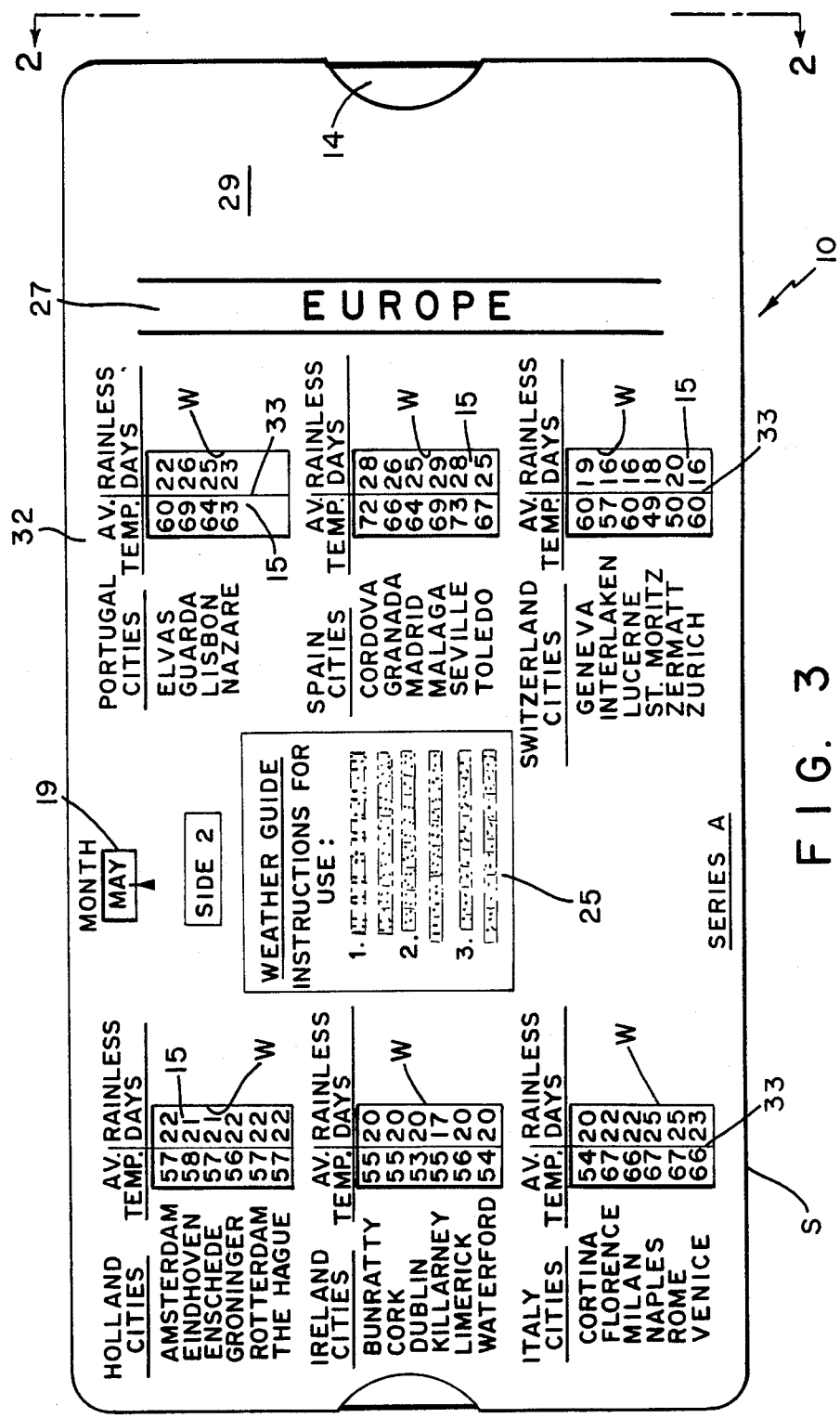
FIG. 3 is a plan view of the weather guide of the invention showing the back panel of the sleeve and with the slide member in a closed position.

As seen by reference to FIGS. 1, 2 and 3 of the drawing, the weather guide 10 includes the outer sleeve generally designated S, which comprises a front panel or face 12 and a back panel or face 32. The insert or slide 14 fits between the panel faces 12 and 32 in relatively slidable relationship therewith. the slide 14 contains temperature and precipitation information on both the front side 16 and the back side 17 as illustrated more fully in FIGS. 4 and 5. The general appearance of the opposite side or face of the insert 14 is similar except, of course, for the numerical weather information which differs for each city and therefore the front side (face) 16 and back side (face) 17 of the slide member 14 contain different weather information derived from actual recorded weather data which corresponds to the different cities. In FIG. 1, the medial insert or slide 14 is shown in the partially extended position while in FIG. 3 the insert or slide 14 is shown in the closed position.

Referring in more detail to the elements on the two panel faces in FIGS. 1 and 3, i.e. the front panel face 12 and the back panel face 32 of the sleeve, it is seen that these two panels of the sleeve are provided with a plurality of openings or windows W six of which, being a convenient and practical number, are shown and seen best in FIGS. 1 and 3. In the embodiment illustrated, these openings W are provided in each of the two panel faces 12 and 32 of the sleeve member. The windows W are of sufficient width to provide a readout only of a limited segment of information, i.e., of the double column 15 (two digits on each side of a vertical separating line 33) and of six vertical lines of information contained on the insert 14. Each line of the two columns, as shown, for example, by reference to each of the six lines of information shown at 15 (FIG. 1 and FIG. 3) provides at a point opposite the city name imprinted on the sleeve, (1) the average noontime temperature for the city for the middle of each month, generally the 15th day of each month, and (2) the average number of precipitation-free days without rain or snow, for each month. The particular month for which the readout is provided opposite each city name in the windows W is that shown in the opening 19. All of this readout information, i.e. the average noontime temperature are precipitation-free days for up to thirty-six cities is coordinately assembled in the proper relationship for each of the twelve months of the year on the faces 16 and 17 of the slide or medial insert 14. The arrangement of data on the faces 16 and 17, i.e. on the front and back sides, of slide insert 14, shown in FIGS. 4 and 5 respectively, is such that when a given month appears in the window 19 the corresponding average noontime temperature and precipitation-free (rainless or snowless) days for the middle of that month will appear opposite the particular city in the corresponding window W. Each of the twelve windows W, six in each panel face of the sleeve, preferably covers one geographical area such as a given country although each window may combine and refer to cities in two or more, usually smaller, countries such as, for example, cities in Denmark and Finland.

Figure 5:
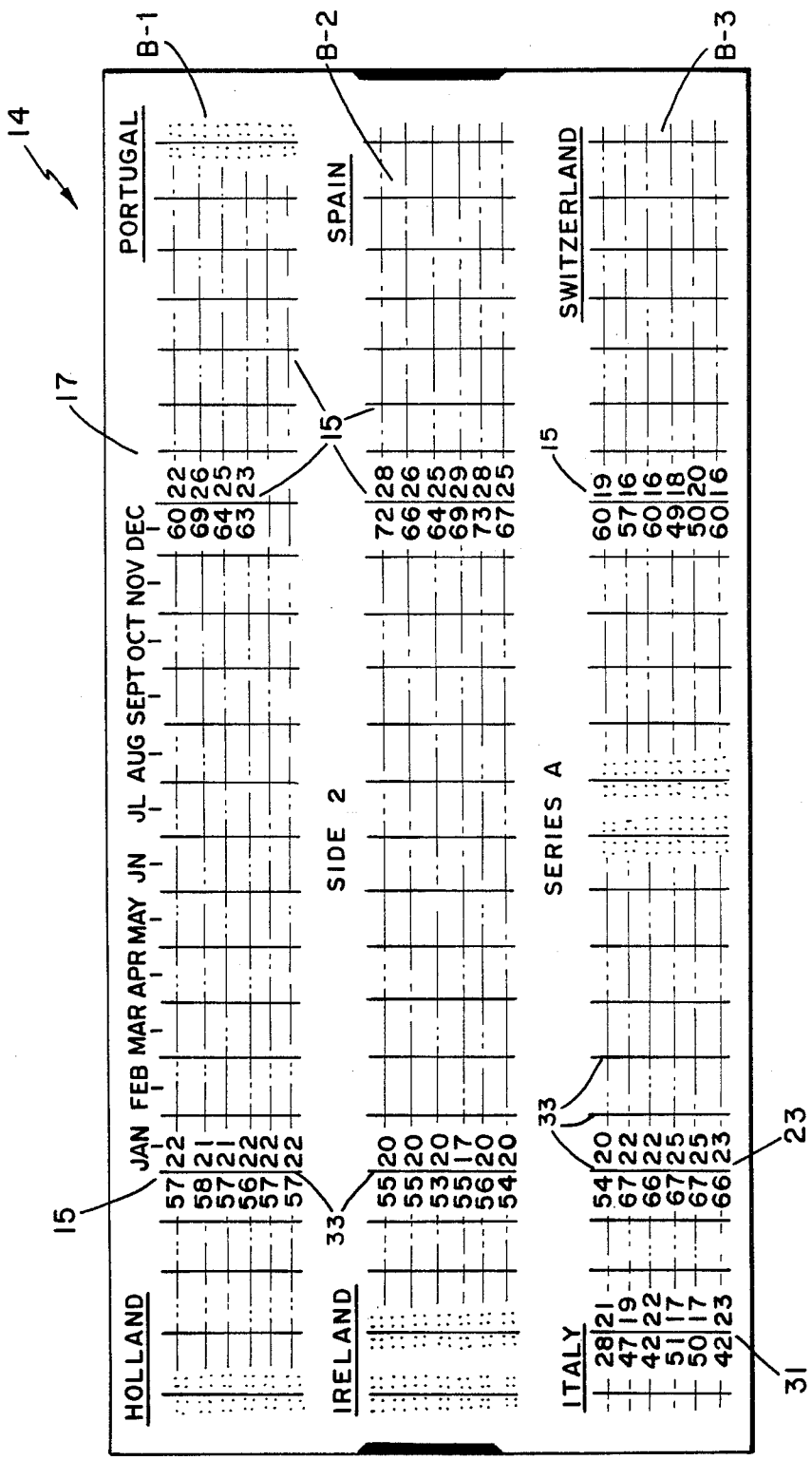
FIG. 5 is a plan view of the back side of the slide (insert) member which fits within the sleeve and which supplies weather information to be read through the openings in the back panel member of the sleeve.

As seen by reference to FIGS. 4 and 5, the insert or slide member 14 as shown in FIG. 4 on face 16, is provided with three horizontal bands designated B-1, B-2 and B-3 of twenty-four (24) vertical columns. The left-hand half of the slidable insert 14, or twelve (12) of the columns, provides the weather information for the cities or localities of the three windows on the left-hand half of the sleeve panel 12 while the right-hand half (remaining) 12 vertical columns, provides the weather information for each of the cities printed adjacent to the three windows located on the right-hand half of the sleeve panel 12 for each month listed on the insert face 16. Similarly, as will be further detailed hereinafter, the opposite side, face 17 as shown in FIG. 5, of the slidable insert 14, contains similar weather data for the cities listed on the back side or "SIDE 2" of the sleeve panel face 32 as shown in FIG. 3. FIG. 1 illustrates "SIDE 1" of the weather guide with the slide 14 partially extended while FIG. 3 shows the slidable insert 14 within the panel faces 12 and 32 of the sleeve in the closed position.

FIG. 2 of the drawing illustrates an end view of the weather guide showing the flat configuration of the device. The slidable insert 14 is shown between the two face panels 12 and 32 of the sleeve S.

The weather guide is sized practically for the intended use. For example, when used by a tourist, it is easily carried in a purse or pocket while a larger, "brief case", size may be more practical for professional use.

FIGS. 1-5 of the drawing illustrate a basic format of the weather guide as a novel device on which weather information is assembled to provide data in a given geographical region or locality. The weather guide of the invention is made to be used manually and may be large or small and may provide data that is entirely within one state or country or cover more widely dispersed locations. Hence, the weather guide may provide weather data over a region that encompasses several countries. Although the weather guide shown in FIGS. 1 and 3 is intended for use in foretelling what the weather conditions likely to be encountered in a number of European countries will be, it will be apparent that a series of weather guides may be provided for foretelling what the weather conditions most likely to be encountered in various different parts of the world will be. For example, a weather guide for foretelling weather conditions in Europe could be designated as Series A and a weather guide for foretelling weather conditions in various countries of Asia might be designated as Series B while still another weather guide for foretelling weather conditions likely to be encountered in the Orient and South Pacific might be designated as Series C, etc. Thus, a tourist or traveler may choose a particular weather guide series to assist him in knowing what kind of weather conditions he may expect in the part of the world he will be traveling to during the time of the year of his trip. Thus, information encompassing weather data on a world wide basis may be assembled for ready reference. In this connection, although the weather guide shown accomodates thirty-six (36) cities on each face of the sleeve by way of modular data bands referenced as B-1, B-2 and B-3 for a total capacity of seventy-two (72) cities, for the embodiment illustrated, it will be apparent that a larger or smaller number of cities may be accomodated. For example, the insert 14 may be modified to contain another, or fourth, modular band of information (not shown) of similar size and content so that the resulting weather guide would contain sufficient weather information for twenty-four additional cities, i.e. twelve additional cities on each side. It is also contemplated that the guide may be arranged to contain a lesser number than the total of seventy-two (72) cities serviced by the front (SIDE 1) and back (SIDE 2) of the slidable insert 14. Practical considerations, most importantly size and legibility, will, of course, dictate the optimum number of cities for the desired end use. For example, if the weather guide is designed not to be carried in a pocket or purse, but rather to be used primarily in an office or other work place, the weather guide may be made relatively larger in size and contain information for a significantly greater number of cities and/or countries.

The panel faces of the sleeve may accomodate a variety of information in addition to the names of cities. For example, the space 24 shown on side 1 (FIG. 1) may contain a list of countries serviced by the weather guide and additional desired information. Similarly, space 25 shown on side 2 (FIG. 3), may contain, for example, instructions for use and other suitable notations. Typical information of this kind imprinted in the space 25 may comprise the following:

Instructions for WEATHER GUIDE use

1. Set month of trip in window at top of GUIDE by sliding insert card to the right or to the left.
2. Locate country and city to be toured during that month.
3. In window to right of city, read average noontime temperature for middle of each month, and the average number of days without rain or snow for that month.

Note: Cities listed also represent unlisted nearby areas and cities for both temperature and rainless days for that selected month.

Additionally, the spaces 26 and 27 on the panels 12 and 32 respectively may identify the region such as "EUROPE" or "ASIA" covered by a particular series of the weather guide while the spaces 28 and 29 on the faces of the two panels, respectively, may be employed for affixation of identifying logo or advertising material.

In the weather guide of the invention, the several views of which are shown in the drawing, panel 12 of the sleeve S illustrated in FIG. 1 is devised to contain the listing of 36 cities, the names of which, in groups of a suitable size, such as groups of six, as shown at 21, are aligned contiguous to the windows W. The corresponding weather information for these cities for a given selected month is displayed through these windows and comprises the numerical data assembled on the face 16 of the slide or insert 14. Similarly, the reverse side 17 of the slide 14 also displays numerical data which has been assembled to be displayed through these windows for a given selected month for an additional 34 cities aligned in groups of six, (except for Portugal) for which only four cities are shown. The names of the cities are aligned next to the windows or openings W in the sleeve panels 12 and 32. The weather data contained on the reverse side, i.e. side 17 of the slide 14, is read through the windows of panel 32 of the sleeve member.

As shown in FIG. 1, the weather guide of the invention is illustrated with the insert or slide partially extended; the month of February is visible in the window 19. In the same manner the weather data contained on side 17 of the slide 14 is visible through the six windows W of the panel 32. Thus, for example, for the month of February, the weather data for London comprises an average noontime temperature of 42° F. and an average of 15 days without rain (see 4th line under column referenced 22 in FIG. 4). Considering the city of Florence, on the other hand (see the 2nd line under the column referenced 23 in FIG. 5), has a reported average noontime temperature of 67° F. and an average of 22 days without rain for the month of May. When the insert is moved to provide a readout for the month of May as shown in FIG. 4 (see 4th line under column referenced 30 in FIG. 4), the average noontime temperature for London for that month is 57° F. with an average of 18 days without rain or snow. In Florence, the average noontime temperature for February is 47° F. and the average number of days without rain is 19. See the 2nd line under the column referenced 31 in FIG. 5.

In a corresponding manner, the weather information for each of the 36 cities listed on the panel face 12 and the 34 cities listed on the panel face 32 may be readily derived for each month by moving the slide 14 within the sleeve so that the desired month is shown in the "month" window 19 and reading the data shown opposite the selected city. The weather data for each city on the panels 12 and 32 of the sleeve is presented on the corresponding faces 16 and 17, respectively, of the slide member 14. To avoid possible mismatching of the proper face of the slide 14 with the corresponding panels of the sleeve, the slide 14 and the sleeve panels are preferably provided with a suitable indicator such as a matched code. As shown, for example, face 16 of slide 14 carries the legend "SIDE 1" (FIG. 4) to indicate the proper side which is to be matched with the legend "SIDE 1" shown below the month window 19 of the sleeve panel 12 (FIG. 1). The reverse side (FIG. 5) of the slide 14 carries the legend "SIDE 2" for matching with the reverse panel 32 of the sleeve (SIDE 2), that legend "SIDE 2" is also shown below the month window 19 of FIG. 3.

In the weather guide illustrated, the temperature has been recited in the Fahrenheit scale. It will be readily appreciated, however, that the temperature may be expressed in terms of the Metric system, i.e. in degrees Celsius or Centigrade particularly where usage of the weather guide is intended for countries in which the Metric scale is primarily used. Additionally, when the weather guide is used in countries where the primary language is other than English, of course, the city names, instructions, and other information applied on the weather guide would be expressed in the language of that particular country concerned.

From the foregoing description and illustrations, the usefulness of the weather guide to indicate typical weather conditions likely to be encountered based on actual historical relevant weather conditions is apparent.

It will be apparent to persons skilled in the art that various changes can be made in the arrangement, quantities and proportions set forth in the foregoing embodiment without departing from the scope of the invention except as required by the limitations expressed in the claims.

What is claimed is:

1. A two-piece slide chart device for foretelling typical weather information at a plurality of geographical diverse locations, said information being based on actual historically recorded weather data for said locations, which comprises:
   (a) a flat sleeve comprising a front face panel member and a back face panel member, at least one of said panel members having a plurality of window-like apertures in fixed associations with named designated locations imprinted on said panel member contiguous to said apertures, said apertures including a first at least one aperture for reading numerical weather information and a second aperture for a time of the year period corresponding to said weather information and
   (b) a slide member inserted in and cooperatively associated within said sleeve and movable with respect thereto and having numerical temperature and precipitation information thereon arranged to appear at said first aperture in the panel and for alignment of the numerical information with the designated locations on said panel member and having times of the year thereon which appear in the second aperture in correspondence with the numerical weather information is said first aperture, said weather indicia on said slide member includes two contiguous scales for a given location comprising
 (1) a scale for the average temperature for sequential periods of time and
 (2) a scale for the average number of precipitation-free days for said sequential periods of time,
so that relative movement of the slide member within said panel member provides in the first aperture weather information corresponding to a location for a given time of the year.

2. The slide chart device of claim 1 wherein both the front face panel member and the back face panel member of the sleeve are provided with window-like apertures and openings and said slide member is provided on both sides with numerical weather temperature and precipitation information.

3. A method for foretelling typical average weather conditions at a plurality of selected locations in a given geographical area based on recorded actual historical weather data for such locations, comprising
 (a) arranging on a slide member printed sequential periods of time and contiguous columns of typical numerical temperature information taken from average recorded temperatures, for specified sequential periods of time, and the average numerical amounts of precipitation information for said sequential periods of time for a plurality of selected locations,
 (b) imprinting on a sleeve member, which comprises a front panel and a rear panel and is provided with a first aperture and a second aperture, the name of said selected locations at a position contiguous to the first aperture formed in said panel member, said slide member arranged to be inserted in said sleeve member and movable with respect thereto, and
 (c) reading the average temperature and the average precipitation information appearing from said slide member through said first aperture panel corresponding to selected locations for each sequential period of time appearing in said second aperture.

4. The method of claim 3 wherein the average temperature employed in (a) is the mid-month noontime temperature.

* * * * *